United States Patent [19]
Eifuku et al.

[11] 4,301,514
[45] Nov. 17, 1981

[54] DATA PROCESSOR FOR PROCESSING AT ONE TIME DATA INCLUDING X BYTES AND Y BITS

[75] Inventors: Yoshiaki Eifuku; Kazunobu Mimura, both of Hadano; Yasuyuki Okada, Sagamihara, all of Japan

[73] Assignee: Hitachi, Ltd., Tokyo, Japan

[21] Appl. No.: 78,723

[22] Filed: Sep. 25, 1979

[30] Foreign Application Priority Data

Apr. 16, 1979 [JP] Japan .................................. 54-46460

[51] Int. Cl.³ .............................................. G06F 7/38
[52] U.S. Cl. .................................... 364/900; 364/749
[58] Field of Search ... 364/200 MS File, 900 MS File, 364/749

[56] References Cited
U.S. PATENT DOCUMENTS
4,021,655  5/1977  Healey et al. ................... 364/200 X Primary Examiner—Raulfe B. Zache
Attorney, Agent, or Firm—Craig and Antonelli

[57] ABSTRACT

A high performance data processor being able to perform an address arithmetic at a high speed without enlarging the scale of the data processor for the increased number of bits of address data is disclosed.

6 Claims, 5 Drawing Figures

FIG. 1 PRIOR ART
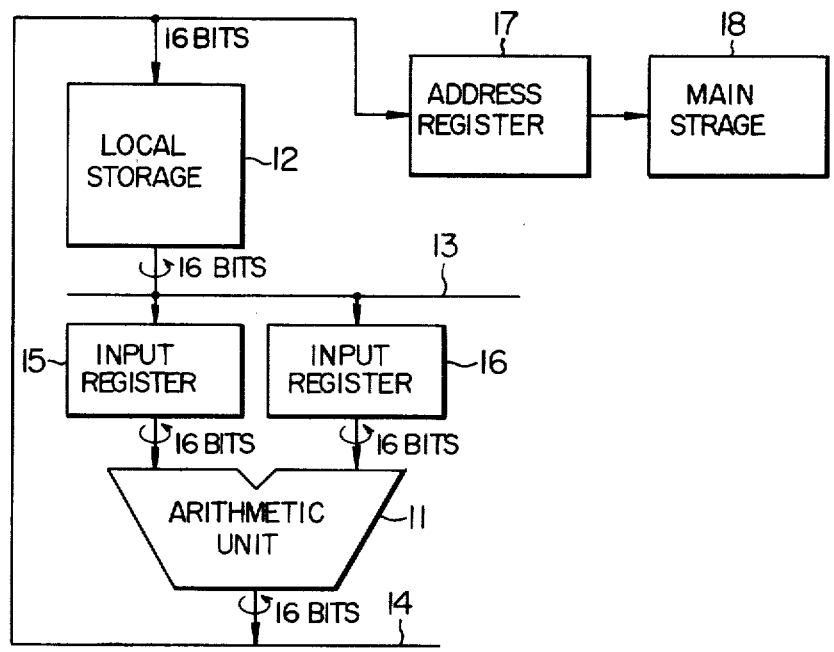
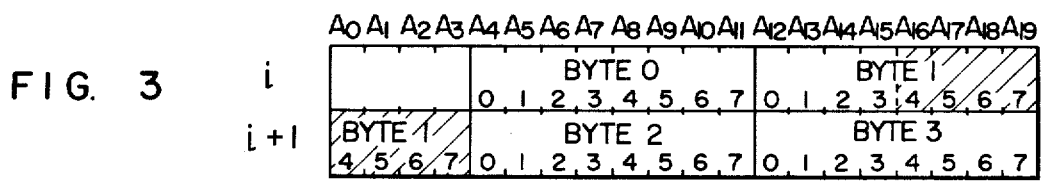
FIG. 3

DATA PROCESSOR FOR PROCESSING AT ONE TIME DATA INCLUDING X BYTES AND Y BITS

BACKGROUND OF THE INVENTION

In general, a data processor includes a plurality of registers which are often packed in a memory unit. Such a memory unit is called a local storage and is provided in the form of a high speed IC memory, for example. The invention relates to a data processor with such a local storage. When the maximum address space handled in the data processor is within 64 kilo-bytes, 16 bits is sufficient for expressing the address data. The address space exceeding 64 kilo bytes needs 17 bits or more for the address data to express such bulky address space. For example, when the address space is 1 megabytes, 20 bits of address data are needed.

A frequently employed countermeasure to reduce the scale of the data processor for cost reducing purpose uses 16 bits (2 bytes) for unitarily expressing the address data, ordinary data transfer, and the processing of those data.

In FIG. 1, there is shown a conventional data processor.

In FIG. 1, a local storage 12 has a proper memory capacity with each word having 16 bits in the word width. The read and write operations for the local storage 12 are performed word by word and two words together identify a single register. Registers assembled in the local storage are, for example, general registers and work registers.

The general register stores address data as an index register or a base register, or ordinary data as an operand register to perform fixed point arithmetic or logical arithmetic. The work register temporarily stores the result of the operations in preparation for arithmetics to be performed later.

The local storage 12 further includes various other registers some of which are not designed for two-word capacity storage. Those just-mentioned registers are not essential to the invention and therefore further explanation of them will be omitted herein.

To an arithmetic unit 11 receiving two input data each with a data width of 16 bits, input data is applied through an input register 15 or 16 from an input bus 13. The output data from the arithmetic unit 11 appears on an output bus 14 and is loaded into the local storage 12 or set into an address register 17.

In a main storage 18, instructions and data are stored and, in the address register 17, write and read addresses of a main storage are stored.

When the data processor thus constructed performs such an address modification in which address data is read out from two sets of registers in the local storage 12 and the output signals read out are added successively in the arithmetic unit 11, the following problem arises. Incidentally, the detail of the address modification will be given subsequently. In the case where the address space handled in the data processor is 64 kilobytes, the address data has 16 bits. Accordingly, the address arithmetic is completed at one time and therefore no problem arises. When the address space is 1 mega-bytes, for example, the address data has 20 bits. In the first address modification, addition is made of the lower 16 bits of the total of 20 bits and, in the second one, addition is made of the remaining bits, the upper 4 bits. As described above, two operations of address modifications are necessary, thus taking a long time for this operation. This leads to deterioration of the performance of the data processor.

To solve such a problem, a method has been proposed in which the word width of the local storage 12 and the input data width of the arithmetic unit 11 are elongated. In the proposal, the number of bytes of those widths must be $2^n$ (n: the number of the byte of the address data) so that, when the address data exceeds two bytes, the word width of the local storage 12 and the input data width of the arithmetic unit 11 must be four bytes. The widening of the word width and the input data width, however, results in an enlargement of the processor scale and thus an increase in the cost of the data processor.

SUMMARY OF THE INVENTION

Accordingly, an object of the invention is to provide a data processor which can improve the performance with a reduced time of address arithmetic without enlarging the scale of the data processor.

In general, the processing of an instruction is made through the following phases: (1) to read out an instruction word to be executed from a main storage, (2) to decode the instruction read out, (3) to perform address arithmetic for address modification to obtain an address in the main storage, (4) to read out an operand from a register or a main storage (5) to perform an arithmetic operation of the operand (this expression will be used hereafter, although there is a case wherein no arithmetic operation is made on the operand), and to load the result of the arithmetic operation into the register or the main storage.

The present invention is directed to the phase (3) of the address arithmetic and the phase (5) of the operand arithmetic. The loading of the result of the arithmetic into the register concerns the invention but the loading of the result into the main storage does not directly concern the invention.

According to the invention, at the phase of the operand arithmetic, the result of the arithmetic is uniquely loaded into a register within the local storage irrespective of the contents of the operand currently being subjected to its arithmetic, although it is generally impossible to judge whether the contents of such an operand are ordinary data or address data within the data processor. At the phase of the address arithmetic for an ensuing instruction, when there occurs a need for reading out address data from a register, the address data with the number of bits sufficient to express an address space can be read out at a time in a data processor according to the invention. Thus, if an arithmetic unit has a data width allowing the address data to be processed at one time, the address arithmetic of each instruction may be processed at a high speed, thus remarkably improving the performance of a data processor.

Other objects and features of the invention will be apparent from the following description taken in connection with the accompanying drawings.

BRIEF DESCRIPTION OF THE DRAWING

FIG. 1 shows a block diagram of a conventional data processor.

FIG. 3 shows a storage state in a register within a local storage used in the data processor shown in FIG. 2.

DESCRIPTION OF THE PREFERRED EMBODIMENTS

Figure 2:
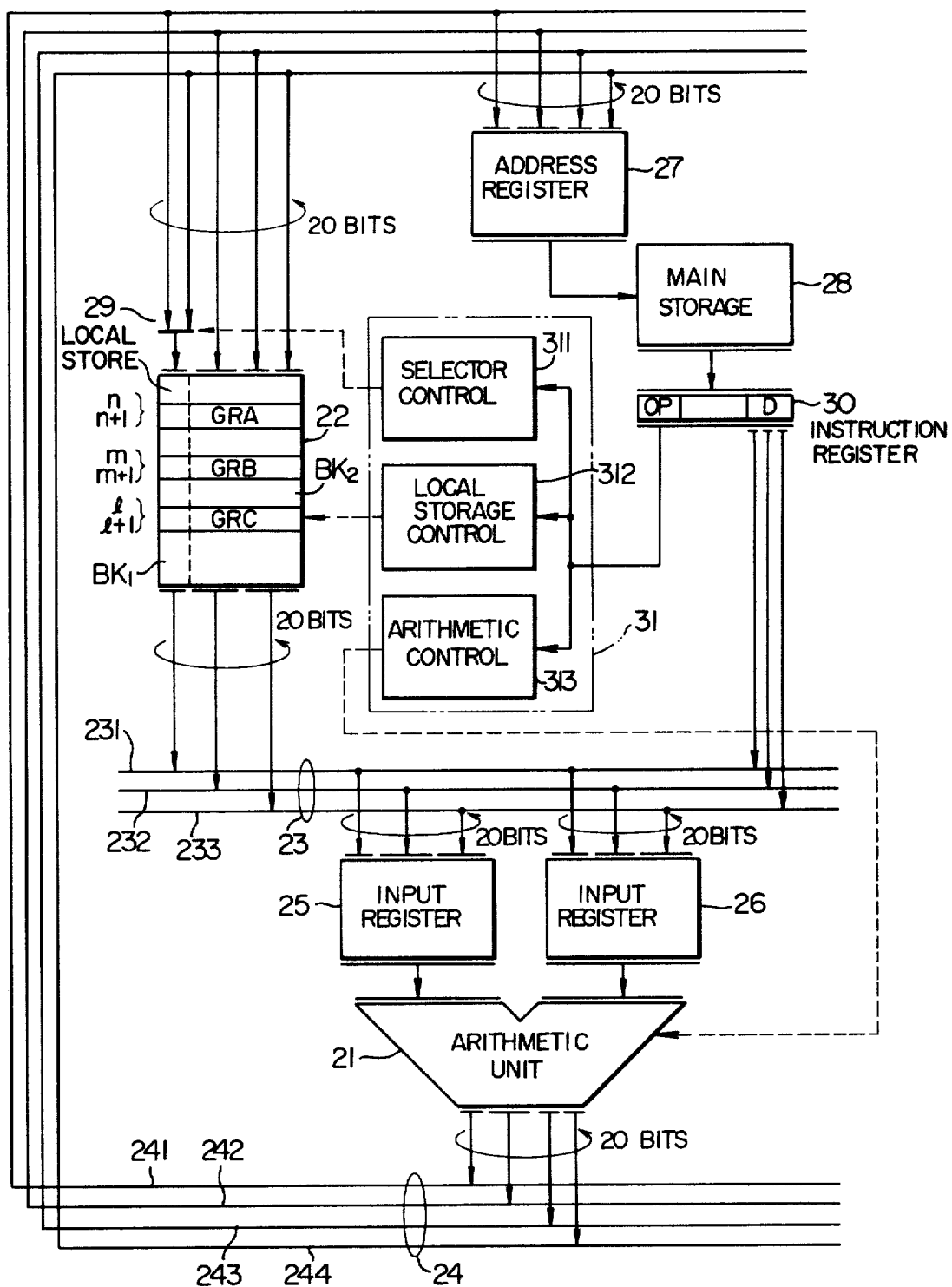
FIG. 2 shows a block diagram of a data processor which is an embodiment according to the invention.

An embodiment of the invention will be described with reference to the drawings. Referring to FIG. 2, there is shown a data processor according to the invention in block form.

In this data processor, an address space has the maximum of 1 mega-bytes. A local storage 22 includes two banks BK1 and BK2 having a common address but accessible independently. The word width of the bank BK1 has 4 bits while that of the bank BK2 has 16 bits. Accordingly, one word in the local storage 22 is composed of 20 bits. With the denotation of A0 to A19 for the 20 bits, 4 bits A0 to A3 are assigned to the bank BK1 and 16 bits A4 to A19 to the bank BK2. One of the registers of the local storage has a maximum capacity of 32 bits (4 bytes) the upper two bytes (0th to 1st bytes) occupy A4 to A19 in an address i; the lower two bytes (2nd to 3rd bytes) A4 to A19 in an address i+1. Incidently, each byte has bit positions 0 to 7.

The widths of the input data applied to the right and left inputs, as viewed in the drawing, of an arithmetic unit 21 are each 20 bits. Input data to the arithmetic unit 21 is supplied from an input bus 23 through input registers 25 and 26. The arithmetic unit 21 is used for both address and operand modification.

The input bus 23 has three data buses 231 to 233 to which, of the data A0 to A19 read out from the local storage 22, 4 bits A0 to A3, 8 bits A4 to A11 and 8 bits A12 to A19 are outputted, respectively.

Output data produced from the arithmetic unit 21 appears on an output bus 24. The output bus 24 has four data buses 241 to 244. The output data from the arithmetic unit 21 also has a maximum of 20 bits. Assume now that those 20 bits are denoted as B0 to B19. 4 bits B0 to B3, 8 bits B4 to B11, 4 bits B12 to B15 and 4 bits B16 to B19 are outputted onto data buses 241 to 244, respectively.

Data on the output bus 24 is written into the local storage 22 or set in an address register 27. The contents of the address register 27 are used as a read or a write address of a main storage 28.

When data B0 to B19 carried by the output bus 24 is written into the local storage 22, data B4 to B19 is always located at the bit positions A4 to A19. The bit positions A0 to A3 have data B0 to B3 or B16 to B19 upon the selection by a selector circuit 29.

An instruction register 30 is supplied with instructions read out from the main storage 28.

A control unit 32 receives instruction words from the instruction register 30 and, in response to the instructions, controls the related portions or units of the data processor. The control unit 31 may be of a microprogram type. The control unit 31 includes a selector control unit 311 for controlling the operation of a selector circuit 29, a local storage control unit 312 for a local storage, an arithmetic control unit 313 for the arithmetic unit 21. Practically, the control unit 31 further includes many other units, although these are not illustrated for simplicity. Those control units control the selector circuit 29, the local storage 22 and the arithmetic unit 21 in the following manner.

The features of the invention, as previously stated, relate to the phases of the address and operand arithmetic. The phase of the operand arithmetic will first be given for ease of explanation.

It is common practice to write the results into a register in the course of the operand arithmetic when the instructions with RR and RX formats are executed.

Figure 4:
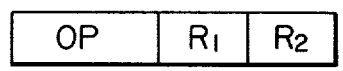
FIGS. 4 and 5 show formats of instructions.

The execution of the instruction with the RR format, illustrated in FIG. 4, will be given. Fields R1 and R2 of the instruction designate a general register having first and second operands stored therein. The result of the first and second operand arithmetic operations are loaded in the general register designated by the fields R1 and R2. The following explanation relates to the case where the 4 bytes of the general registers GRA and GRB are operated upon and the results of the arithmetic operations are loaded into the general register GRA. Assume that the general registers GRA and GRB are constructed by addresses n and n+1 and m and m+1 in the local storage 22.

The operand read-out phase will first be given. A first step executes a read-out of the operand. In the step, A4 to A19 are read out from the address n+1 of the bank BK2 in the local storage 22 and the read out bits are set in the input register 25 through the input bus 23. The contents of the register occupy the second and the third byte of the general register GRA.

A second step also executes the read-out of the operand. In this step, A4 to A19 are read out from the address m+1 of the bank BK2 in the local storage 22 and the read out bits are set in the input register 26 through the input bus 23. The contents of the register occupy the second and the third byte of the general register GRB.

A third step executes the operand arithmetic. In this step, the contents of the input registers 25 and 26 are operated upon in the arithmetic unit 21 and the results of the operations are loaded into A4 to A19 at the address n+1 of the bank BK2 in the local storage 22, through the output bus 24.

A fourth step executes again the read-out of the operand. In this step, A4 to A19 are read out from the address n of the bank BK2 in the local storage 22 and the readout bits are set in the input register 25 through the input bus 23. The contents of the register occupy the 0th and 1st byte of the general register GRA.

A fifth step also executes the read-out of the operand. In this step, A4 to A19 are read out from the address m of the bank BK2 in the local storage 22, and the read-out bits are set in the input register 26 through the input bus 23. The contents of the register occupy the 0th and the 1st byte of the general register GRB.

A sixth step executes the operand arithmetic. The contents of the input registers 25 and 26 are operated upon in the arithmetic unit 21 and the results of the operations are loaded into A4 to A19 in the address n of the bank BK2 in the local storage 22. At this time, the selector circuit 29 produces data B16 to B19 which in turn are loaded into A0 to A3 in the address n+1 of the bank BK1.

The 4 byte data thus operated upon is stored in the register GRA within the local storage 22 in a storing state as shown in FIG. 3. Note here that the contents of A16 to A19 in the address n is the same as that of A0 to A3 in the address n+1.

This is correspondingly applied to the loading of the operand arithmetic into the other registers.

In the above-mentioned operation, there are cases in which the read-out operation is made only from the bank BK2 in the local storage 22, as in the steps 1, 2, 4 and 5. In such cases, the read-out operation from the BK2 is allowed while the application of the data A0 to A3 into the input bus 23, the input registers 25 and 26 or the arithmetic unit 21 is inhibited or the data operated in the arithmetic unit 21 is limited to within 16 bits so as to prohibit the operation of data of more than 16 bits.

There also is a case in which the write-in operation is made only into the bank BK2 in the local storage 22, as in the step 3. In this case, the write-in operation into the bank BK1 is allowed while the selector 29 is allowed to produce none of the data.

Figure 5:
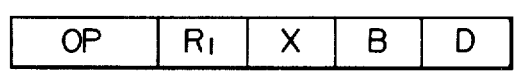

The address arithmetic phase follows. It is known to those skilled in the art that the address arithmetic phase takes place when instructions of the RX or RS type are executed. Therefore, the address arithmetic phase when an instruction of the RX type is executed, will be described. The RX type instruction has the format as shown in FIG. 5. In the format, the field R1 designates the general register for storing the first operand. The fields X and B designate the index register and the base register in the local storage 22. Further, the field D designates the displacement. In the address arithmetic phase, by summing the contents of the index address register, the base register and the diplacement, an address of the main storage unit 28 where the second operand is stored is obtained.

The address arithmetic when the general registers GRA and GRB used in the operand arithmetic are designated by the fields X and B, will be described.

In a first step, A0 to A19 are read out from the address n+1 of each bank BK1 and BK2 in the local storage 22 and the read out bits are set in the input register 25 through the input bus 23.

In a second step, A0 to A19 are read out from the address m+1 of each bank BK1 and BK2 in the local storage 22 and the read out bits are set in the input register 26 through the input bus 23.

In a third step, the contents of the input registers 25 and 26 are summed in the arithmetic unit 21 and the result of the summation is loaded into the work register GRC within the local storage 22 through the output bus 24. If the work register GRC is constructed by the addresses 1 and 1+1 in each bank BK1 and BK2, the result of the summation is loaded into the address 1+1 of each bank BK1 and BK2. At this time, the selector circuit 29 produces the data B0 to B3 on the output bus 241.

In a fourth step, A0 to A19 are read out from the address 1+1 of each bank BK1 and BK2 in the local storage 22, and the readout bits are set in the input register 25 by way of the input bus 23.

In a fifth step, the displacement D in the instruction is taken out from the instruction register 30 and is set in the input register 26 by way of the input bus 23.

In a sixth step, the contents of the input registers 25 and 26 are summed by the arithmetic unit 21 and the result of the addition is set in the address register 27 through the output bus 24. The contents of the address register 27 becomes the address of the second operand in the main storage unit 28.

The address modifications mentioned above are performed at much higher speed, compared to the conventional ones. In the conventional case, the lower 16 bits of those 20 bits are operated at the first time in the first to third steps and the remaining upper 4 bits are operated at the second time in the fourth to fifth steps. On the other hand, the data processor according to the invention can read out the address data of 20 bits at a time from the local storage 22 and process the entire 20 bits at a time in the arithmetic unit 21. Therefore, the data processor according to the invention can perform the address arithmetic at a speed twice as high as that of the conventional data processor.

In the above-mentioned embodiment, the arithmetic unit 21 is used for both the address and the operand arithmetic, but separate units may be used for these operations. In this case, the arithmetic unit for the address arithmetic must have both the right and the left input data widths each of 20 bits like the arithmetic unit 21. However, in the arithmetic unit for the operand arithmetic, 16 bits suffices for the input data width thereof since such an arithmetic unit has only to process data of 2 bytes.

The invention has been described with reference to a data processor handling the address data of 20 bits for addressing a space of 1 mega-bytes. Evidently, the data processor according to the invention may be applied to other data processor systems using address data other than the above. As described above, the data processor according to the invention is able to process the address arithmetic at a higher speed.

We claim:

1. A data processor comprising:
a memory unit in which each word has the number of bits including X bytes+Y bits, and two words form one register;
means for loading data to be loaded into the lower Y bits in the upper word also into the upper Y bits in the lower word when the result of the operand arithmetic is loaded into said register;
an arithmetic unit capable of processing data in numbers of bits including X bytes+Y bits at a time; and
means for reading out X bytes in the upper and lower words of said register separately when the data in said register is inputted into said arithmetic unit for executing the operand arithmetic.

2. A data processor according to claim 1, wherein said memory unit includes two banks with a common address and each bank has X bytes+Y bits assigned thereto.

3. A data processor according to claim 1, wherein said means for loading includes a data selector provided on a path for the upper Y bits of write-in data for said memory unit, and said data selector selects either the upper Y bit portion of the write-in data or the lower Y bit portion.

4. A data processor according to claim 1, wherein said arithmetic unit is used for both the operand arithmetic and the address arithmetic.

5. A data processor according to claim 1, wherein said register is a general register.

6. A data processor comprising:
a memory unit in which each word has the number of bits including X bytes+Y bits and two words form one register;
means for loading data to be loaded into the lower Y bits in the upper word also into the upper Y bits in the lower word when the result of the operand arithmetic is loaded into a register and for loading the result of the address arithmetic into the entire lower word of a register;
an arithmetic unit capable of processing data the number of bits including X bytes+Y bits at a time; and
means for reading out X bytes in the upper and lower words of the register separately when the data in the register is inputted into said arithmetic unit for executing the operand arithmetic, and for reading out the entire lower word of said register at a time when the data in said register is inputted into said arithmetic unit for executing the address arithmetic.

* * * * *